United States Patent
Chen

(10) Patent No.: US 7,911,684 B1
(45) Date of Patent: Mar. 22, 2011

(54) VARIABLE GAIN ERBIUM DOPED FIBER AMPLIFIER

(75) Inventor: Guansan Chen, Fremont, CA (US)

(73) Assignee: Oplink Communications, Inc., Fremont, CA (US)

( * ) Notice: Subject to any disclaimer, the term of this patent is extended or adjusted under 35 U.S.C. 154(b) by 411 days.

(21) Appl. No.: 12/044,823

(22) Filed: Mar. 7, 2008

(51) Int. Cl.
*H04B 10/17* (2006.01)
*H04B 10/12* (2006.01)

(52) U.S. Cl. .................................. 359/337.1
(58) Field of Classification Search .............. 359/337.1
See application file for complete search history.

(56) References Cited

U.S. PATENT DOCUMENTS

| | | | |
|---|---|---|---|
| 5,430,572 A * | 7/1995 | DiGiovanni et al. | 359/341.33 |
| 6,061,171 A | 5/2000 | Taylor et al. | |
| 6,236,498 B1 * | 5/2001 | Freeman et al. | 359/337.1 |
| 6,246,511 B1 * | 6/2001 | Jameson | 359/337 |
| 6,320,693 B1 | 11/2001 | Cereo et al. | |
| 6,335,821 B1 * | 1/2002 | Suzuki et al. | 359/337.11 |
| 6,388,806 B1 * | 5/2002 | Freeman et al. | 359/341.3 |
| 6,421,169 B1 * | 7/2002 | Bonnedal et al. | 359/337.1 |
| 6,529,316 B1 * | 3/2003 | Treyz et al. | 359/337.11 |
| 6,535,329 B1 | 3/2003 | Pelard et al. | |
| 6,690,506 B2 * | 2/2004 | Zahnley et al. | 359/337.11 |
| 6,943,937 B2 | 9/2005 | Lelic et al. | |
| 7,031,051 B2 * | 4/2006 | Liu et al. | 359/341.2 |
| 2002/0176156 A1 * | 11/2002 | Zahnley et al. | 359/341.4 |
| 2004/0085624 A1 * | 5/2004 | Liu et al. | 359/341.3 |

OTHER PUBLICATIONS

Kakui et al. "Dynamic-gain-tilt-free long-wavelength band erbium doped fiber amplifiers utilizing temperature dependent characteristics of gain spectrum", Optical Fiber Conference, 2000 vol. 2, pp. 6-8, (2000).*
Giles et al., Modeling Erbium-Doped Fiber Amplifiers, *Journal of Lightwave Technology*, vol. 9, No. 2 (Feb. 1991), pp. 271-283.
Yamada et al., Temperature Dependence of Signal Gain in $Er^{3+}$-Doped Optical Fiber Amplifiers, *IEEE Journal of Quantum Electronics*, vol. 28, No. 3 (Mar. 1992), pp. 640-649.
OptiAmplifier, Technical Background, *Optical Fiber Amplifier and Laser Design Software*, Copyright 2002 Optiwave Corporation, pp. 1-156.
OptiAmplifier, Tutorials, *Optical Fiber Amplifier and Laser Design Software*, Copyright 2002 Optiwave Corporation, pp. 1-166.

* cited by examiner

*Primary Examiner* — Eric Bolda
(74) *Attorney, Agent, or Firm* — Fish & Richardson P.C.

(57) ABSTRACT

Systems, methods, and apparatuses are provided for variable gain optical fiber amplifiers. In one implementation, a variable gain optical amplifier is provided. The amplifier includes a first erbium doped fiber configured to receive an input optical signal, a second erbium doped fiber configured to output an output optical signal, a gain flattening filter positioned between the first erbium doped fiber and the second erbium doped fiber, a pump laser configured to provide energy to the first erbium doped fiber and the second erbium doped fiber, a thermo electric cooler configured to control a temperature of one or more of the first erbium doped fiber and the second erbium doped fiber, and a controller configured to adjust an output from the pump laser and a temperature of at least one of the first erbium doped fiber and the second erbium doped fiber to provide a variable flat spectral gain output.

22 Claims, 5 Drawing Sheets

VARIABLE GAIN ERBIUM DOPED FIBER AMPLIFIER

BACKGROUND

The present disclosure relates to optical fiber amplifiers. Conventional optical fiber communications typically use dense wavelength division multiplexing (DWDM). DWDM allows a plurality of light streams having distinct and finely spaced wavelengths to propagate together, e.g., in a single-mode fiber. DWDM therefore increases a bandwidth for an optical fiber network. Implementations of DWDM include the use of DWDM filters, which can combine (e.g., multiplex) a plurality of separate light streams having finely spaced wavelengths into a single-mode fiber. DWDM filters can also separate (e.g., demultiplex) a combined light stream (e.g., a multiplexed signal) exiting from a fiber into a plurality of separate light streams each having one or more distinct, spaced wavelengths.

Typical optical networks using DWDM include erbium doped fiber amplifiers (EDFA's). When a multiplexed optical signal propagates through an EDFA, ideally each light stream is amplified independently without interaction among the propagating light streams.

An erbium doped fiber (EDF) is a form of a single-mode fiber, having a core that is heavily doped with erbium. Conventional EDFA's include a pump laser that provides a pump light to the erbium doped fiber to provide amplification. For example, when pump light at 980 nm or 1480 nm is launched into an EDF, erbium atoms absorb the pump light, pushing the erbium atoms into excited states. When stimulated by light streams, for example an input optical signal having wavelengths in a C-band (1528-1570 nm) or an L-band (1570-1620 nm), the excited atoms return to a ground or lower state by stimulated emission. The stimulated emission has the same wavelength as that of the stimulating light. Therefore, the optical signal is amplified as it is propagating through the EDF. Furthermore, the EDF typically amplifies all received light streams regardless of wavelength.

Conventional EDFA's allow optical signals to propagate a long distance in an optical fiber network without using electronic repeaters. An electronic repeater is an electrical amplifier module that typically includes a light detector, an electrical amplifier, and a light emitter, e.g., a laser diode. Using an EDFA in an optical network allows amplification to be performed without converting light to electricity, amplified in an electrical domain, and then converting electricity back to light.

Typically, a gain provided by an EDFA is not uniform across wavelengths of the optical signal. A wavelength dependent gain (or the spectral gain) is a characteristic of the doped material in an EDFA. Additionally, the wavelength dependent gain changes shape for different average gain values (e.g., how the gain changes with wavelength varies according to the average gain value being provided).

A wavelength dependent attenuating filter can be designed to compensate for the wavelength dependent gain of an EDFA at a specific average gain value such that the combined effect provides an ideally flat gain for all operating wavelengths. Such a wavelength dependent attenuating filter is typically referred to as a gain flattening filter (GFF).

An EDFA using a GFF to provide a spectrally flat gain typically includes two EDF's that are coupled by a GFF. The first EDF amplifies an input optical signal. The amplified optical signal is then filtered by the GFF, which typically attenuates one or more wavelengths of the optical signal. The second EDF then further amplifies the filtered optical signal attenuated by the GFF.

Conventional GFF's are configured to provide a flat gain for a specific average gain value only. If another average gain for the EDFA is required, a pump power supplied to both EDF's must be changed accordingly. However, for the new average gain, the spectral gain will be no longer be flat. A GFF alone cannot provide a variable flat spectral gain for different average gain values. Therefore, one compensation technique is to include a variable optical attenuator (VOA) element together with the GFF between two EDF's. To set a new average gain, the pump power is changed and the VOA is configured to provide a specified attenuation. The combined effect of the pump power and the VOA can provide a flat gain for the newly selected average gain.

SUMMARY

Systems, methods, and apparatuses are provided for variable gain optical fiber amplifiers. In general, in one aspect, a variable gain optical amplifier is provided. The amplifier includes a first erbium doped fiber configured to receive an input optical signal, a second erbium doped fiber configured to output an output optical signal, a gain flattening filter positioned between the first erbium doped fiber and the second erbium doped fiber, a pump laser configured to provide energy to the first erbium doped fiber and the second erbium doped fiber, a thermo electric cooler configured to control a temperature of one or more of the first erbium doped fiber and the second erbium doped fiber, and a controller configured to adjust an output from the pump laser and a temperature of at least one of the first erbium doped fiber and the second erbium doped fiber to provide a variable flat spectral gain output.

Implementations of the aspect can include one or more of the following features. The controller can be configured to monitor an input power to the first erbium doped fiber, an output power from the second erbium doped fiber, and a temperature of one or more of the first erbium doped fiber and the second erbium doped fiber. The thermo electric cooler can be configured to either increase or decrease a temperature of one or more of the first erbium doped fiber and the second erbium doped fiber.

The amplifier can further include a first photo-detector configured to measure a power of the input optical signal entering the first erbium doped fiber and a second photo-detector configured to measure a power of the output optical signal exiting the second erbium doped fiber. The amplifier can further include a first tap configured to direct a portion of the input optical signal to the first photo-detector and a second tap configured to direct a portion of the output optical signal to the second photo-detector.

The amplifier can further include a sensor for sensing a temperature of the first erbium doped fiber or the second erbium doped fiber. The amplifier can further include a splitter for splitting light from the pump laser into a first pump laser light and a second pump laser light for supplying pump energy to the first erbium doped fiber and the second erbium doped fiber, a first wavelength division multiplexing filter for combining an input optical signal and the first part of the pump laser light, and a second wavelength division multiplexing filter for combining optical signal exiting the gain flattening filter and the second part of the pump laser light.

The amplifier can further include a structure enclosing at least the first erbium doped fiber or the second erbium doped fiber, the structure isolating a first temperature within the structure from a second temperature outside the structure.

The amplifier can further include a plurality of optical isolators, each optical isolator preventing light from propagating in a backward direction relative to the direction of an input optical signal. The input optical signal can be a multiplexed optical signal including a plurality of wavelengths ranging from substantially 1528 nm to 1570 nm or from substantially 1570 nm to 1620 nm. The wavelength of the pump laser can be substantially 980 nm or 1480 nm.

In general, in another aspect, a method is provided. The method includes receiving an input multiplexed optical signal, amplifying the multiplexed optical signal to provide a first amplified optical signal, filtering the first amplified optical signal to provide a filtered optical signal, amplifying the filtered optical signal to provide an second amplified optical signal for output, and controlling the amplification including adjusting a pump laser power and a temperature of one or more erbium doped fibers to provide variable flat spectral gain output.

Implementations of the method can include one or more of the following features. The method can further include isolating one or more components of an amplifier that provides the amplification such that a temperature of the isolated components is controllable. The method can further include monitoring a power of the input multiplexed optical signal, monitoring a power of the second amplified optical signal, and monitoring a temperature of one or more optical components of the amplifier. The filtering can include attenuating one or more wavelengths of the first amplified optical signal. The method can further include receiving an input to adjust an average gain provided by the amplification to a new average gain, determining pump laser power and erbium doped fiber temperature to provide the new average gain, and adjusting the pump laser power and temperature to provide the new average gain.

In general, in another aspect, a variable gain optical amplifier is provided. The amplifier includes a first erbium doped fiber configured to amplify an input optical signal to provide an amplified input optical signal, a second erbium doped fiber configured to further amplify a filtered optical signal to provide an amplified output optical signal, a gain flattening filter positioned between the first erbium doped fiber and the second erbium doped fiber configured to filter an amplified optical signal from the first erbium doped fiber, a pump laser configured to provide energy to the first erbium doped fiber to amplify the input optical signal and to the second erbium doped fiber to amplify the filtered optical signal, a thermo electric cooler configured to control a temperature of the first erbium doped fiber and the second erbium doped fiber, and a controller configured to adjust an output from the pump laser and a temperature of the first erbium doped fiber and the second erbium doped fiber to provide a variable flat spectral gain output.

Implementations of the aspect can include one or more of the following features. The amplifier can further include a first photo-detector for measuring the power of the input optical signal, a second photo-detector for measuring the power of the amplified output optical signal, and a sensor for sensing a temperature of the first erbium doped amplifier and the second erbium doped fiber, where the controller uses the power measured from the first and second photo detectors and the sensed temperature to provide the variable flat spectral gain output.

The amplifier can further include a first tap for directing a portion of the input optical signal to the first photo detector, a second tap for directing a portion of the amplified output optical signal to the second photo-detector, a splitter for splitting light from the pump laser into a first pump light portion and a second pump light portion for supplying pump energy to the first and the second erbium doped fibers, a first wavelength division multiplexing filter for combining the input optical signal and the first pump light portion into the first erbium doped fiber, a second wavelength division multiplexing filter for combining the filtered signal and the second pump light portion into the second erbium doped fiber, a first isolator for blocking light propagating backward opposing the input signal, a second isolator for blocking light propagating backward into the first erbium doped fiber, and a third isolator for blocking light propagating backward into the second erbium doped fiber.

In general, in another aspect, a method is provided. The method includes receiving an input to adjust an average gain of an amplifier from a first average gain to a second average gain, the first average gain and the second average gain each being substantially flat across a plurality of wavelengths, determining a pump laser power and erbium doped fiber temperature to provide the second average gain, and adjusting the pump laser power and temperature to provide the second average gain. Adjusting the temperature can further include lowering a temperature of one or more erbium doped fibers.

Particular embodiments of the subject matter described in this specification can be implemented to realize one or more of the following advantages. A variable EDFA can be provided that has low pump power requirements and a short EDF length.

Additionally, a compact EDFA can provide a variable flat spectral gain without using a VOA and requiring few photodetectors. A variable EDFA can also be provided that has low, uniform noise. The EDFA can reduce cost and provide high reliability, and simple assembly.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
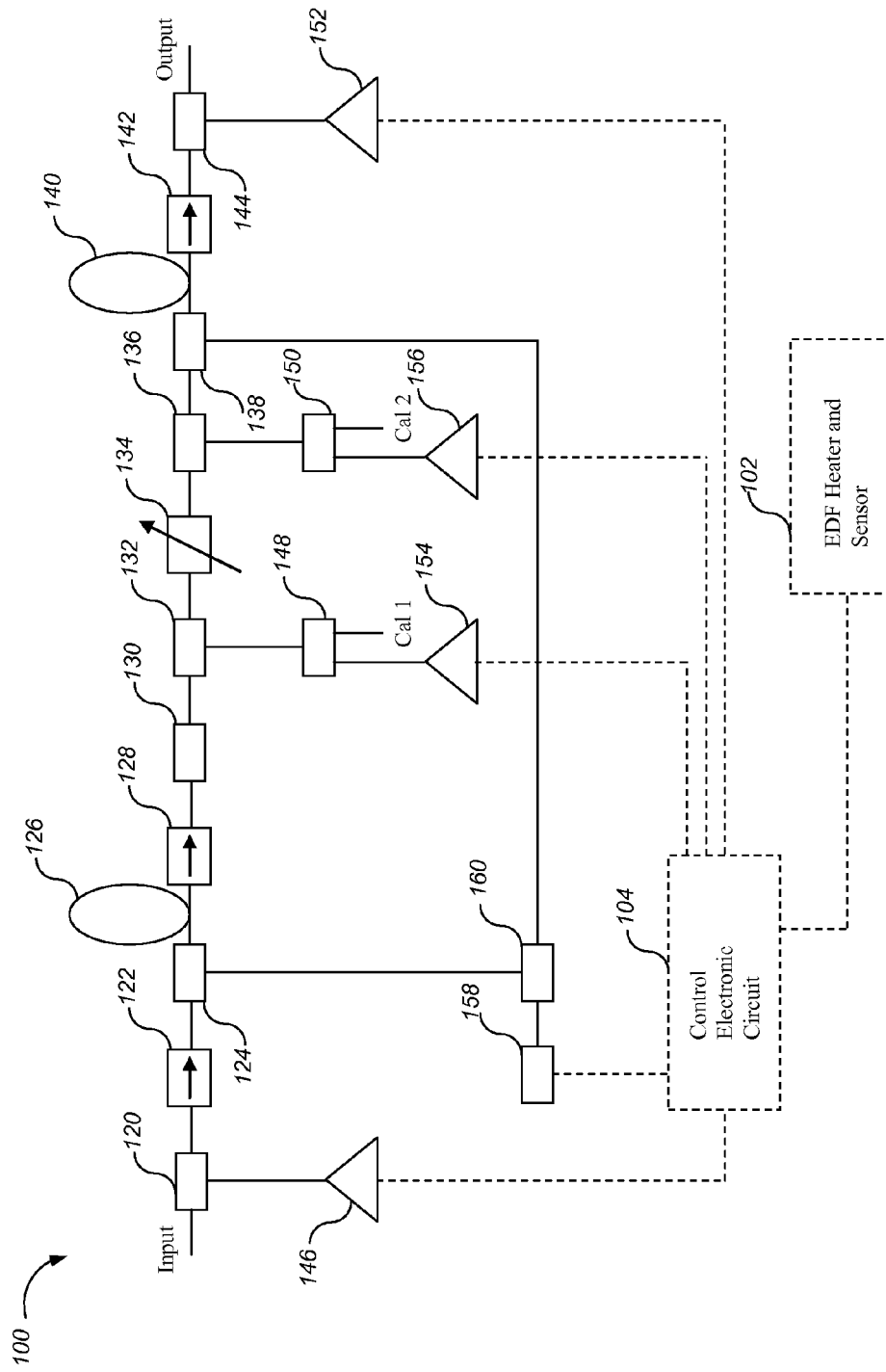
FIG. 1 is a block diagram of a conventional EDFA using a VOA.

FIG. 1 shows a block diagram of a conventional EDFA 100 using a variable optical attenuator (VOA) 134 to provide a variable flat spectral gain for an input multiplexed optical signal. The EDFA 100 includes first and second erbium doped fibers (EDF's) 126 and 140, photo-detectors 146, 152, 154, and 156, and pump laser 158.

The multiplexed optical signal, having a plurality of wavelengths, input to the EDFA 100 is tapped by a tap 120 to the photo-detector 146. The photo-detector 146, using the tapped optical signal, measures the total input power. The tap 120 can be, for example, a fused fiber coupler. In some implementations, the tap 120 directs substantially 1% to 5% of the multiplexed optical signal to the photo-detector 146. The majority of the multiplexed optical signal is passed through tap 120 and incident to a first isolator 122. The first isolator 122 allows light to propagate in a forward direction only while blocking light propagating in a backward direction.

Light from the pump laser 158 is split by a splitter 160 and directed to first and second wavelength division multiplexing (WDM) filters 124 and 138, respectively. For example, in some implementations, the splitter 160 directs 40% of the pump laser to the first WDM filter 124 and 60% to the second WDM filter 138. The first WDM filter 124 combines the multiplexed optical signal exiting from the first isolator 122 with a portion of the pump light from splitter 160.

The combined optical signal is then input into the first EDF 126. The first EDF 126 absorbs the energy of the pump light. The absorbed pump energy is used to amplify the light of the multiplexed optical signal to provide an amplified optical signal. The amplified optical signal exiting from the first EDF 126 passes through a second isolator 128.

The input signal is amplified by the first EDF 126. However, the gain provided by the first EDF 126 is not uniform over the signal spectrum (i.e., across all wavelengths of the optical signal). To provide a flat spectral gain across all wavelengths, the amplified signal is filtered by a gain flattening filter (GFF) 130. The GFF 130 attenuates one or more wavelengths by a particular amount.

After passing through the GFF 130, a resulting filtered optical signal passes through a tap 132, the VOA 134, and a tap 136. After being attenuated by the VOA 134, the attenuated optical signal reaches the second WDM filter 138. The second WDM filter 138 combines the attenuated optical signal and the portion of the pump light from splitter 160. The combined optical signal is input into the second EDF 140. The second EDF 140 absorbs the energy of the pump light and further amplifies the attenuated optical signal.

The total power of the filtered optical signal before entering into the VOA 134 is measured by photo-detector 154 through use of taps 132 and 148. Similarly, the total power of the attenuated optical signal after passing through the VOA 134 is measured by photo-detector 156 through use of taps 136 and 150. Taps 148 and 150 provide calibration of the VOA 134.

The amplified attenuated optical signal exiting from the second EDF 140 passes through a third isolator 142 and is tapped by a tap 144. The tap 144 directs a portion of the amplified attenuated optical signal to a photo-detector 152 used to measure the power of the amplified attenuated optical signal. The majority of the amplified attenuated signal exits the tap 144 and is output from the EDFA 100.

The average gain of the EDFA 100 can be calculated as a ratio between the total output power measured by photo-detector 152 and the total input power measured by photo-detector 146.

The gain provided by each EDF (e.g., first EDF 126 and second EDF 140) is sensitive to temperature. If an EDFA is used in an environment having a particular temperature range, for example -5 C to 65 C, the working temperature can be set at the maximum temperature, e.g., at 65 C. A heater and a sensor are employed (e.g., EDF heater and sensor 102) to control the temperature of EDF with a control electronic circuit (e.g., control electronic circuit 104). If the temperature is below 65 C, the heater will increase the temperature of each EDF. However, the heater cannot lower the temperature of an EDF.

A theoretical model for the spectral gain of an EDFA can be found, for example, in C. R. Giles and E. Desurvire, "Modeling erbium-doped fiber amplifiers," Journal of Lightwave Technology, Vol. 9, pp. 271-283 (1991); M. Yamada, M. Shimizu, M. Horiguchi, and M. Okayasu, "Temperature dependence of signal gain in Er3+-doped optical fiber amplifiers," IEEE Journal of Quantum Electronics, Vol. 28, pp. 640-649 (1992); and "OptiAmplifier, Technical Background and Tutorials, Optical Fiber Amplifier and Laser Design Software," Optiwave Corporation, 7 Capella Court, Ottawa, Ontario, K2E 8A7, Canada (2002), which are hereby incorporated by reference.

Figure 2:
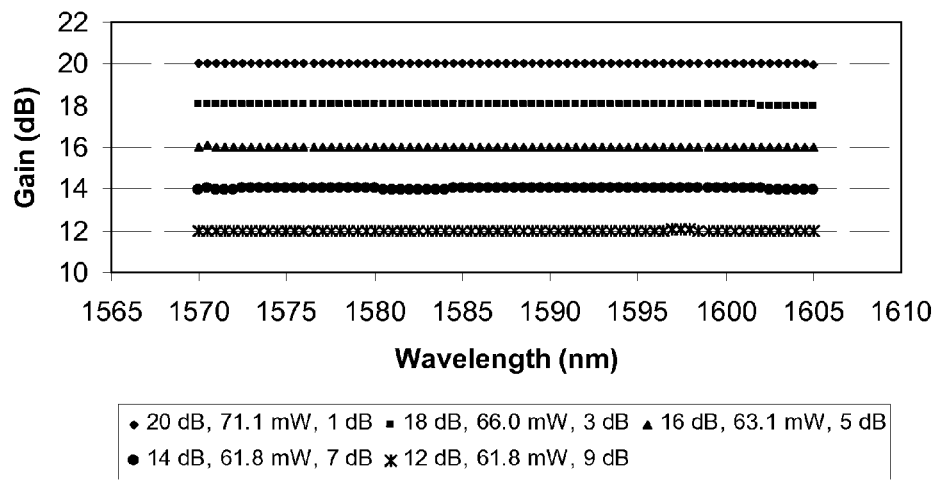
FIG. 2 shows an example display of a spectral gain of a variable gain EDFA using a VOA.

FIG. 2 shows an example display 200 of a spectral gain of a variable gain EDFA using a VOA. The gain for different wavelengths at a specified temperature and total input power can be computed according to a theoretical model. For example, the gain for different wavelengths at temperature 65 C, and total input power -13 dBm, can be computed as illustrated in display 200. As shown in display 200, to provide a flat spectral gain of 20 dB, a pump laser emits 71.1 mW laser light at 1480 nm, and the VOA is set at its minimum insertion loss, e.g., 1 dB. To provide a flat gain of 18, 16, 14, and 12 dB, the pump laser emits 66, 63.1, 61.8, and 61.8 mW power, respectively. The VOA is set accordingly at 3, 5, 7, and 9 dB insertion loss, respectively, to provide a spectrally flat gain.

Figure 3:
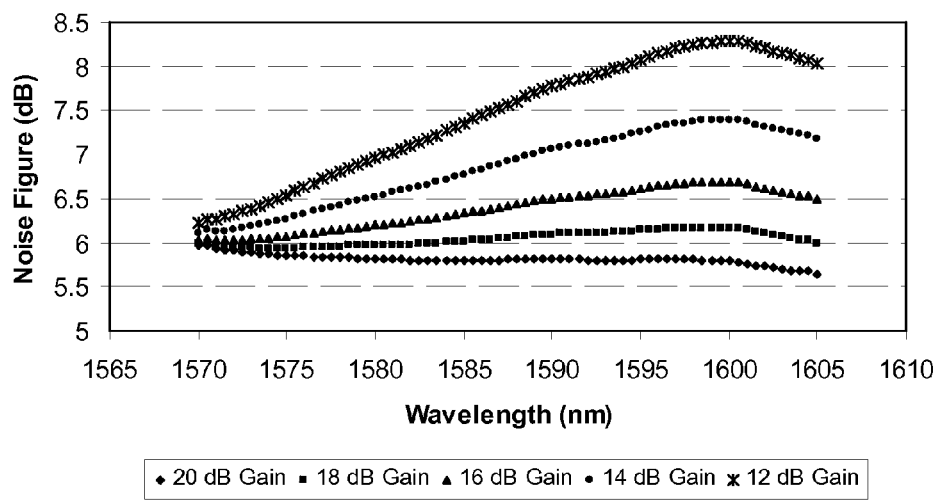
FIG. 3 shows an example noise display for a variable gain EDFA using a VOA.

FIG. 3 shows an example noise display 300 for a variable gain EDFA using a VOA. Noise display 300 shows that the noise is not flat but instead varies with wavelength. Additionally, the noise is higher for lower gain. The noise is higher at lower gain because for low gain, a higher VOA insertion loss results to provide a spectrally flat gain. Consequently, the higher insertion loss causes spontaneous emission to become significant and increase the noise.

Figure 4:
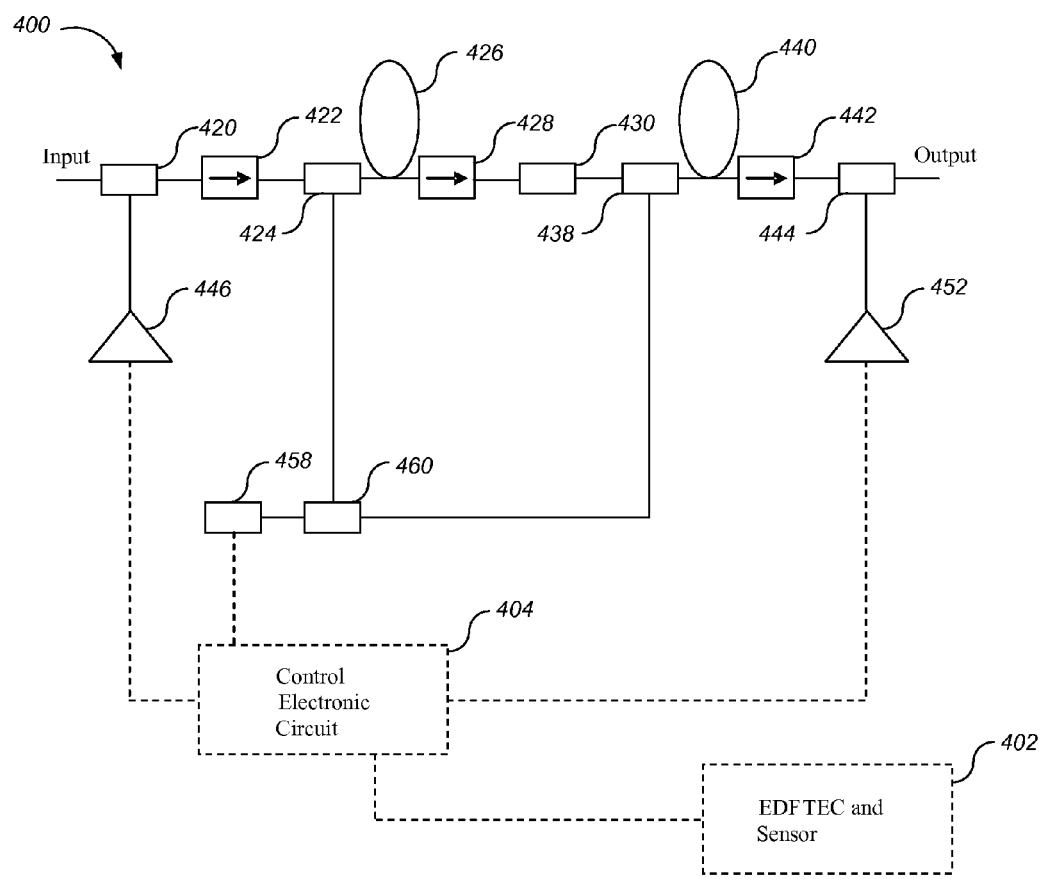
FIG. 4 shows a block diagram of an example variable gain EDFA using pump power and temperature control.

FIG. 4 shows a block diagram of an example variable gain EDFA 400 using pump power and temperature control. Variable gain EDFA 400 includes first EDF 426, second EDF 440, pump laser 458, and first and second photo-detectors 446 and 452. The variable gain EDFA 400 also includes an EDF thermo electric cooler (TEC) and sensor 402 (collectively referred to as "TEC 402") coupled to a controller 404 (e.g., a control electronic circuit). In contrast to the EDFA 100 of FIG. 1, there is no VOA included in the variable gain EDFA 400. Additionally, the EDFA 400 includes fewer taps and photo-detectors as compared with the EDFA 100 of FIG. 1.

A TEC is a small solid state device that functions as a heat pump. A typical unit can be a few millimeters thick by a few millimeters to a few centimeters square. In some implementations the TEC is a sandwich formed by two ceramic plates with an array of small Bismuth Telluride cubes in between. When a DC current is applied, heat is moved from one side of the device to the other, where it is removed, e.g., using a heatsink. If the current is reversed the device acts as a heater. Thus, the TEC can be used as both a cooler and as a heater. In some implementations, the TEC can be a Peltier device.

In operation, a portion of an input multiplexed optical signal is tapped by a tap 420 to the photo-detector 446. The photo-detector 446, using the tapped optical signal, measures a total input power to the EDFA 400. The tap 420 can be, for example, a fused fiber coupler. In some implementations, the tap 420 directs substantially 1% to 5% of the multiplexed optical signal to the first photo-detector 446. The majority of the multiplexed optical signal is passed through the tap 420 and incident to a first isolator 422. The first isolator 422 is optically coupled to tap 420. Isolator 422 allows light to propagate in forward direction only while blocking light propagating in a backward direction.

Light from the pump laser 458 for supplying energy to the first EDF 426 and the second EDF 440 is split by a splitter 460 into two parts, which are directed to first and second WDM filters 424 and 438, respectively. For example, in some implementations, the splitter 460 directs substantially 40% of the pump laser to first WDM filter 424 and substantially 60% to second WDM filter 438. The first WDM filter 424 combines the multiplexed optical signal exiting from the first isolator 422 with a portion of the pump light from splitter 460.

The combined optical signal is then input into the first EDF 426. The first EDF 426 absorbs the energy of the input pump light. The absorbed pump energy is used to amplify the light of the multiplexed optical signal to provide an amplified optical signal. The amplified optical signal exiting from the first EDF 426 passes through a second isolator 428 that is optically coupled to the first EDF 426. The second isolator 428 blocks light that propagates in a backward direction into the first EDF 426.

The amplified signal exiting isolator 428 is then filtered by a GFF 430, providing a filtered optical signal. The GFF 430 is a gain flattening filter to flatten the spectral gain of a specific average gain (e.g., by attenuating particular wavelengths of the filtered optical signal).

After exiting the GFF 430, the filtered optical signal is incident upon a second WDM filter 438. The second WDM filter 438 combines the filtered signal and part of pump light from the splitter 460 into the second EDF 440. The second EDF 440 absorbs the energy of the pump light and further amplifies the filtered optical signal.

An amplified filtered optical signal exiting from the second EDF 440 passes through a third isolator 442 for blocking light propagating in a backward direction into the second EDF 440. A portion of the amplified filtered optical signal exiting from the third isolator 442 is tapped by a tap 444 to the second photo-detector 452 to measure a power of the amplified filtered optical signal. The majority of the amplified filtered optical signal exits tap 444 and is output from the EDFA 400.

The TEC 402 is controlled by the controller 404 to set the temperature of first and second EDF's 426 and 440. For example, a temperature-sensing sensor of the TEC 402 and associated with each EDF sends a signal to the controller 404 that identifies the temperature of the first EDF 426 and/or the second EDF 440. The controller 404 uses the input signals from the temperature-sensor to control the TEC 402. The controller 404 also receives signals from first and second photo-detectors 446 and 452 and controls the power of pump laser 458 according to the received signals.

Figure 5:
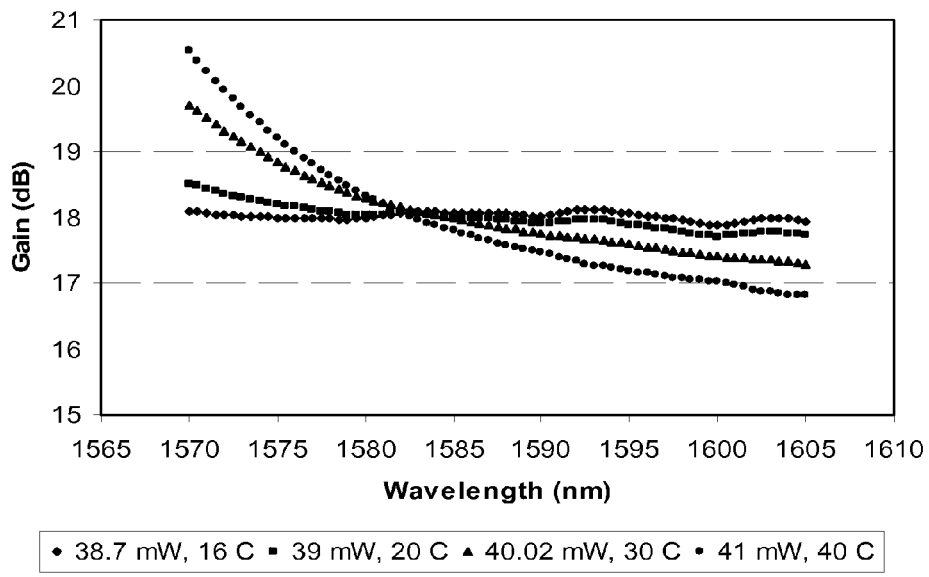
FIG. 5 shows an example display of a spectral gain of a variable gain EDFA using pump power and temperature control.

FIG. 5 shows an example display 500 of a spectral gain of a variable gain EDFA (e.g., EDFA 400 of FIG. 4) provided using pump power and temperature control. For example, in some implementations, the EDFA can include a pump laser (e.g., pump laser 458) that is configured to emit light at wavelengths of either 980 nm or 1480 nm. Additionally, the input multiplexed optical signal can be in a C-band (1528-1570 nm) or an L-band (1570-1620 nm). Using these inputs a spectral gain function can be generated that uses the interplay between the three key parameters: average gain, pump power, and temperature. The resulting spectral gain function is derived numerically and is presented graphically in display 500 for L-band signals and a 1480 nm pump light. In particular, display 500 shows the spectral gains for specific values of pump power (1480 nm) and temperature to provide an average gain of 18 dB for the L-band signals having a total input power of −13 dBm. The average gain is a ratio between the total output power (e.g., detected by photo-detector 452) and the total input power (e.g., detected by photo-detector 446).

As shown in display 500, an 18 dB average gain can be provided by a 39 mW pump power at 20 C, a 40.02 mW pump power at 30 C, and a 41 mW pump power at 40 C. These average gains are not flat across wavelengths in the L-band. Instead, only the gain provided by a 38.7 mW pump power at 16 C is flat against all operating wavelengths from 1570 to 1605 nm (L-band). Therefore, to provide a flat gain of 18 dB the pump power and the temperature are set at 38.7 mW and 16 C, respectively.

Figure 6:
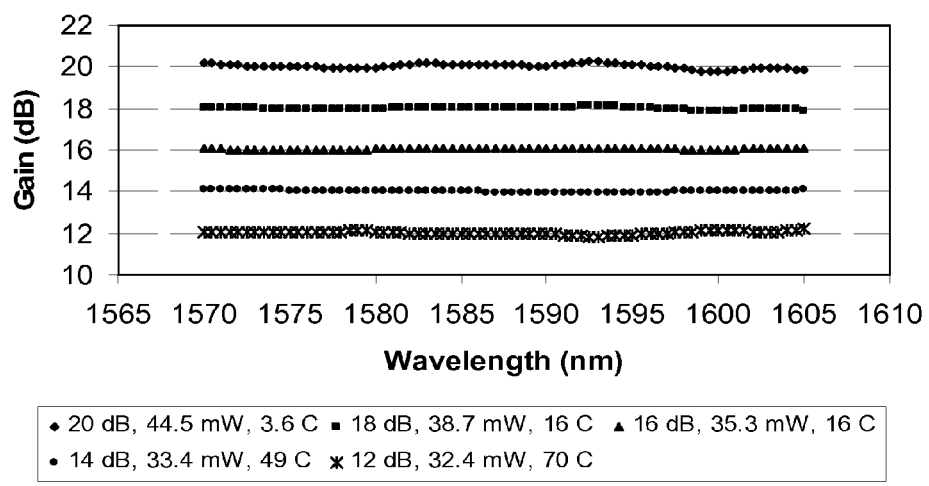
FIG. 6 shows an example display of a spectral gain of a variable gain EDFA using pump power and temperature control.

FIG. 6 shows an example display 600 of a spectral gain of a variable gain EDFA using pump power and temperature control. The display 600 illustrates spectral gains for different conditions. In order to provide a flat gain, the pump power and the temperature are set to particular values. Example values of pump power and temperature used to provide a particular flat spectral average gain are shown below in Table 1.

TABLE 1

| Flat Spectral Average Gain | Pump Power | Temperature |
|---|---|---|
| 20 dB | 44.5 mW | 3.6 C. |
| 18 dB | 38.7 mW | 16 C. |
| 16 dB | 35.3 mW | 30 C. |
| 14 dB | 33.4 mW | 49 C. |
| 12 dB | 32.4 mW | 70 C. |

In contrast to a heater (e.g., EDF heater and sensor 102 of FIG. 1) that can raise the temperature only, the TEC in EDFA (e.g., EDF TEC and sensor 402 of FIG. 4) can rise and lower the temperature, for example, in response to commands from the control electronic circuit (e.g., control electronic circuit 402 of FIG. 4). The controlled temperature of each EDF in the EDFA can be monitored, for example, by the sensor of TEC 402, to maintain a particular temperature needed to provide a specific average gain value. Similarly, the power of the pump laser is also controlled by the control electronic circuit to maintain a particular pump laser power to provide a specific average gain value.

To effectively and precisely control the temperature of the EDF's of the EDFA (e.g., first and second EDF's 426 and 440), the EDF's can be positioned within a structure (e.g., a box), which can isolate the temperature inside the structure from the ambient temperature outside the structure. In some implementations, the structure encloses elements of the EDFA including the first and second EDF's. The TEC can control a flow of heat across a wall inside and outside the structure. Additionally, the sensor can detect the temperature in the structure as the temperature of the EDF's. The detected temperature can be used as feedback information for continual adjustments of temperature to actively maintain a particular EDF temperature.

Figure 7:
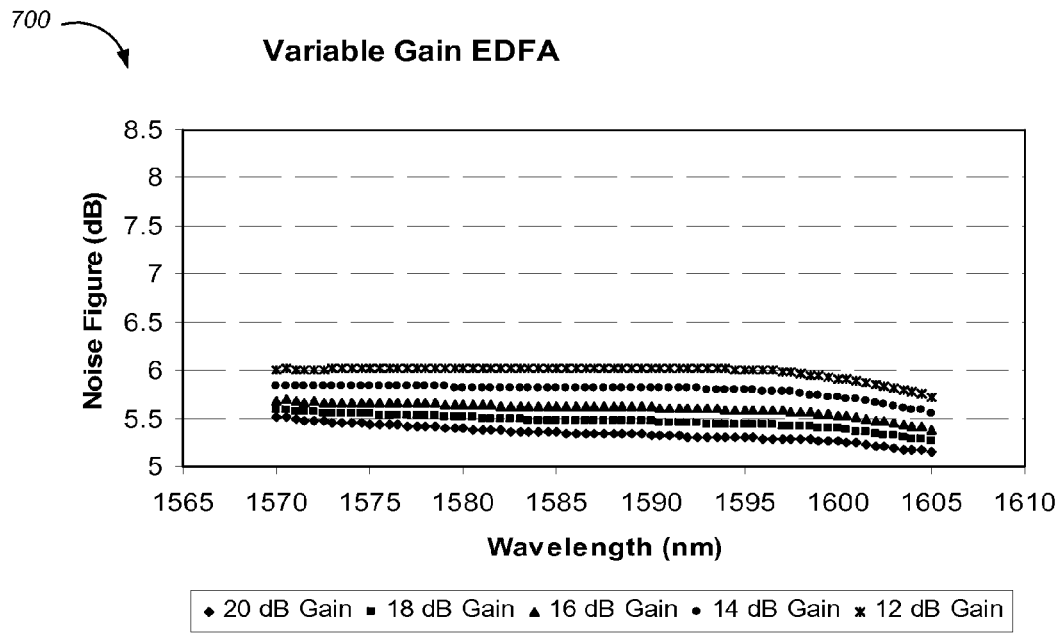
FIG. 7 shows an example noise display for a variable gain EDFA using pump power and temperature control.

FIG. 7 shows an example noise display 700 for a variable gain EDFA using pump power and temperature control. The noise display 700 shows that the noise figure is relatively flat across wavelengths for each gain value. Additionally, the noise value is low as compared with the noise values shown for the EDFA 100 in FIG. 3, for example, because no VOA is used.

Figure 8:
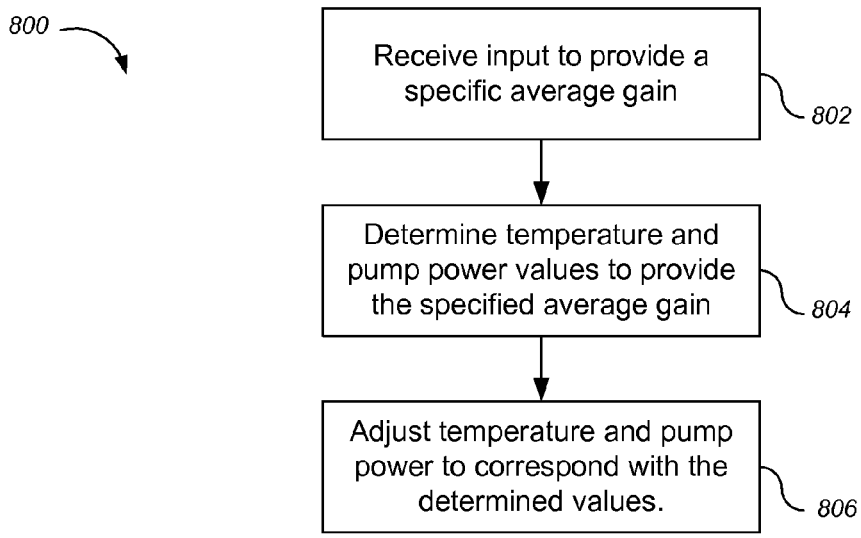
FIG. 8 shows an example method for providing a flat spectral gain for different average gain values.

FIG. 8 shows an example method 800 for providing a flat spectral gain for different average gain values. The method 800 can be performed by a system (e.g., an optical amplification system). At step 802 a specified average gain is determined. For example, an input can be received that instructs a system to change an existing average gain value to a new average gain value.

At step 804 a temperature value and pump power are determined to provide the specified average gain as a flat spectral average gain. For example, the system can determine a temperature value for one or more erbium doped fibers. In some implementations, the system consults a table of temperature and pump power values corresponding to particular average gain values. Alternatively, the system can calculate the temperature and pump power values directly (e.g., according to a particular formula relating average gain to temperature and pump power).

At step 806 the temperature and pump power are adjusted to correspond with the determined values. For example, a controller can signal a pump laser to provide a specified output pump light. Similarly, the controller can signal a thermo electric cooler to increase or decrease the temperature of one or more EDF's based on the current temperature of the one or more EDF's (e.g., as measured by one or more temperature sensors).

A number of embodiments of the invention have been described. Nevertheless, it will be understood that various modifications may be made without departing from the spirit and scope of the invention. Accordingly, other embodiments are within the scope of the following claims.

What is claimed is:

1. A variable gain optical amplifier comprising:
   a first erbium doped fiber configured to receive an input optical signal;
   a second erbium doped fiber configured to output an output optical signal;
   a gain flattening filter positioned between the first erbium doped fiber and the second erbium doped fiber;
   a pump laser configured to provide energy to the first erbium doped fiber and the second erbium doped fiber;
   a thermo electric cooler configured to control a temperature of one or more of the first erbium doped fiber and the second erbium doped fiber; and
   a controller configured to adjust an output from the pump laser and a temperature of at least one of the first erbium doped fiber and the second erbium doped fiber to provide a variable flat spectral gain output.

2. The amplifier of claim 1, where the controller is configured to monitor an input power to the first erbium doped fiber, an output power from the second erbium doped fiber, and a temperature of one or more of the first erbium doped fiber and the second erbium doped fiber.

3. The amplifier of claim 1, where the thermo electric cooler is configured to either increase or decrease a temperature of one or more of the first erbium doped fiber and the second erbium doped fiber.

4. The amplifier of claim 1, further comprising:
   a first photo-detector configured to measure a power of the input optical signal entering the first erbium doped fiber; and
   a second photo-detector configured to measure a power of the output optical signal exiting the second erbium doped fiber.

5. The amplifier of claim 4, further comprising:
   a first tap configured to direct a portion of the input optical signal to the first photo-detector; and
   a second tap configured to direct a portion of the output optical signal to the second photo-detector.

6. The amplifier of claim 1, further comprising:
   a sensor for sensing a temperature of the first erbium doped fiber or the second erbium doped fiber.

7. The amplifier of claim 1, further comprising:
   a splitter for splitting light from the pump laser into a first pump laser light and a second pump laser light for supplying pump energy to the first erbium doped fiber and the second erbium doped fiber;
   a first wavelength division multiplexing filter for combining an input optical signal and the first part of the pump laser light; and
   a second wavelength division multiplexing filter for combining optical signal exiting the gain flattening filter and the second part of the pump laser light.

8. The amplifier of claim 1, further comprising:
   a structure enclosing at least the first erbium doped fiber or the second erbium doped fiber, the structure isolating a first temperature within the structure from a second temperature outside the structure.

9. The amplifier of claim 1, further comprising:
   a plurality of optical isolators, each optical isolator preventing light from propagating in a backward direction relative to the direction of an input optical signal.

10. The amplifier of claim 1, where the input optical signal is a multiplexed optical signal including a plurality of wavelengths ranging from substantially 1528 nm to 1570 nm.

11. The amplifier of claim 1, where the input optical signal is a multiplexed optical signal including a plurality of wavelengths ranging from substantially 1570 nm to 1620 nm.

12. The amplifier of claim 1, where the wavelength of the pump laser is substantially 980 nm or 1480 nm.

13. A method comprising:
   receiving an input multiplexed optical signal;
   amplifying the multiplexed optical signal to provide a first amplified optical signal;
   filtering the first amplified optical signal to provide a filtered optical signal;
   amplifying the filtered optical signal to provide a second amplified optical signal for output; and
   controlling the amplification including adjusting a pump laser power and a temperature of one or more erbium doped fibers to provide variable flat spectral gain output.

14. The method of claim 13, further comprising:
   isolating one or more components of an amplifier that provides the amplification such that a temperature of the isolated components is controllable.

15. The method of claim 13, where controlling the amplifier further comprises:
   monitoring a power of the input multiplexed optical signal;
   monitoring a power of the second amplified optical signal; and
   monitoring a temperature of one or more optical components of the amplifier.

16. The method of claim 13, where filtering includes attenuating one or more wavelengths of the first amplified optical signal.

17. The method of claim 13, further comprising:
   receiving an input to adjust an average gain provided by the amplification to a new average gain;
   determining pump laser power and erbium doped fiber temperature to provide the new average gain; and
   adjusting the pump laser power and temperature to provide the new average gain.

18. A variable gain optical amplifier comprising:
   a first erbium doped fiber configured to amplify an input optical signal to provide an amplified input optical signal;
   a second erbium doped fiber configured to further amplify a filtered optical signal to provide an amplified output optical signal;

a gain flattening filter positioned between the first erbium doped fiber and the second erbium doped fiber configured to filter an amplified optical signal from the first erbium doped fiber;

a pump laser configured to provide energy to the first erbium doped fiber to amplify the input optical signal and to the second erbium doped fiber to amplify the filtered optical signal;

a thermo electric cooler configured to control a temperature of the first erbium doped fiber and the second erbium doped fiber; and a controller configured to adjust an output from the pump laser and a temperature of the first erbium doped fiber and the second erbium doped fiber to provide a variable flat spectral gain output.

19. The amplifier of claim 18, further comprising:

a first photo-detector for measuring the power of the input optical signal;

a second photo-detector for measuring the power of the amplified output optical signal; and a sensor for sensing a temperature of the first erbium doped amplifier and the second erbium doped fiber, where the controller uses the power measured from the first and second photo-detectors and the sensed temperature to provide the variable flat spectral gain output.

20. The amplifier of claim 19, further comprising:

a first tap for directing a portion of the input optical signal to the first photo-detector;

a second tap for directing a portion of the amplified output optical signal to the second photo-detector;

a splitter for splitting light from the pump laser into a first pump light portion and a second pump light portion for supplying pump energy to the first and the second erbium doped fibers;

a first wavelength division multiplexing filter for combining the input optical signal and the first pump light portion into the first erbium doped fiber;

a second wavelength division multiplexing filter for combining the filtered signal and the second pump light portion into the second erbium doped fiber;

a first isolator for blocking light propagating backward opposing the input signal;

a second isolator for blocking light propagating backward into the first erbium doped fiber; and a third isolator for blocking light propagating backward into the second erbium doped fiber.

21. A method comprising:

receiving an input to adjust an average gain of an output optical signal of an amplifier from a first average gain to a different second average gain, the first average gain and the second average gain each being substantially flat across a plurality of wavelengths;

determining a pump laser power and erbium doped fiber temperature to provide the second average gain; and adjusting the pump laser power and temperature to provide the second average gain.

22. The method of claim 21, where adjusting the temperature further comprises:

lowering a temperature of one or more erbium doped fibers.

* * * * *